(12) United States Patent
Chung

(10) Patent No.: US 6,382,820 B1
(45) Date of Patent: May 7, 2002

(54) ILLUMINATING NOVELTY DEVICE FOR A HUBCAP

(76) Inventor: Hyon Chol Chung, 16 Cliff Way, Port Washington, NY (US) 11050

( * ) Notice: Subject to any disclaimer, the term of this patent is extended or adjusted under 35 U.S.C. 154(b) by 0 days.

(21) Appl. No.: 09/662,725

(22) Filed: Sep. 15, 2000

(51) Int. Cl.⁷ .............................................. H02K 11/00
(52) U.S. Cl. ...................... 362/500; 362/192; 362/193; 310/73; 310/75 C
(58) Field of Search ................................ 362/500, 192, 362/193; 310/73, 75 C

(56) References Cited

U.S. PATENT DOCUMENTS

| | | | |
|---|---|---|---|
| 4,539,496 A | 9/1985 | Thomas et al. | 310/68 B |
| 4,725,928 A | 2/1988 | Strepek | 362/78 |
| 4,775,919 A | 10/1988 | Pearsall et al. | 362/78 |
| 4,893,877 A | 1/1990 | Powell et al. | 301/108 R |
| 5,497,302 A | 3/1996 | O'Donnell | 362/78 |
| 5,876,108 A | 3/1999 | Chien | 362/35 |
| 6,116,763 A | * 9/2000 | King | 362/500 |

* cited by examiner

Primary Examiner—Thomas M. Sember
(74) Attorney, Agent, or Firm—Richard L. Miller

(57) ABSTRACT

An illuminating novelty device for a hubcap that includes a primary housing, illuminators, and a generator. The illuminators include a strip of LEDs that extends diametrically across the primary housing. The generator includes a secondary housing that extends in the primary housing, a shaft, a weight fixedly suspended from the shaft to prevent rotation of the shaft when the secondary housing is rotating, an armature that is fixedly attached to the shaft to form a stator, a pair of pole pieces that are disposed diametrically around the armature and fixedly attached to the secondary housing for rotation therewith to form a rotor, a commutator that is fixed to the shaft and split lengthwise into a pair of parts, wherein each part extends 90 degrees around the shaft, and is spaced 90 degrees apart from an adjacent part, a pair of brushes that are diametrically affixed to the secondary housing for rotation therewith and move along the commutator as the secondary housing rotates, and a pair of wires that electrically communicate the pair of brushes with the pair of terminals, respectively. When the primary housing is rotated by virtue of the hubcap rotating, the illuminators form a BMW pattern.

8 Claims, 2 Drawing Sheets

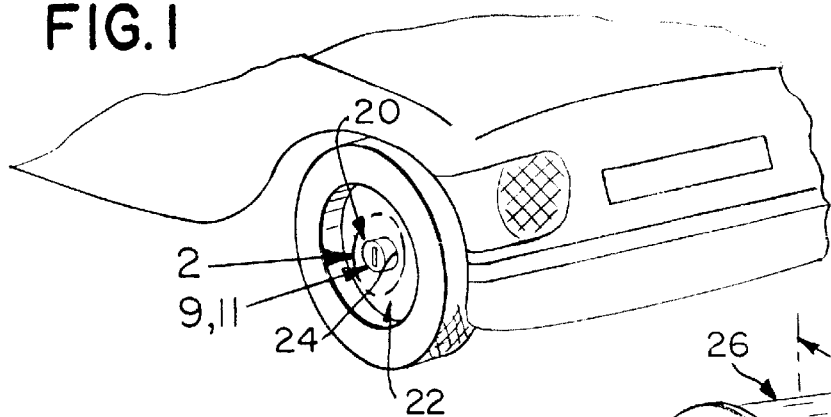
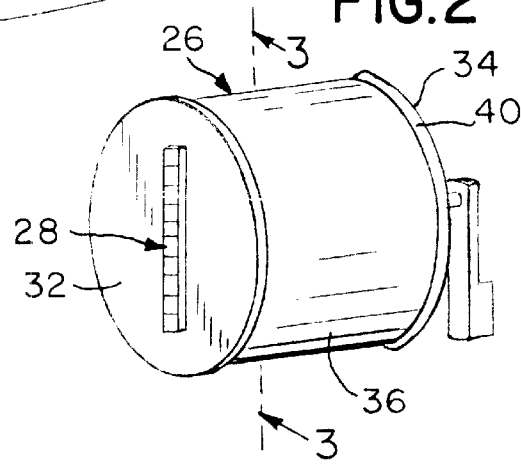
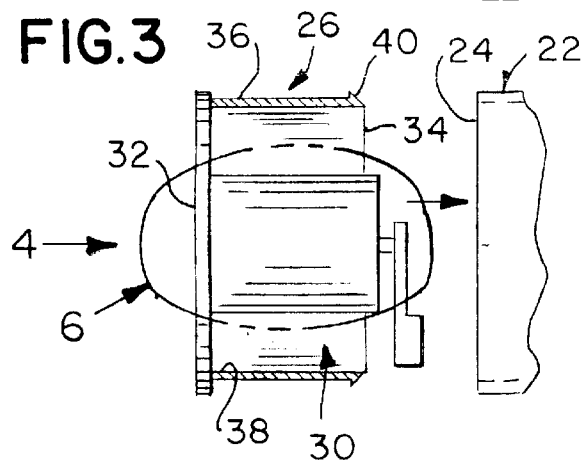
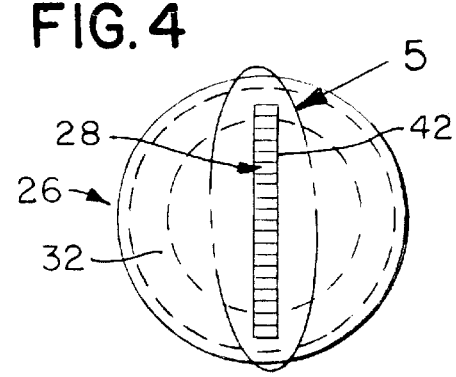
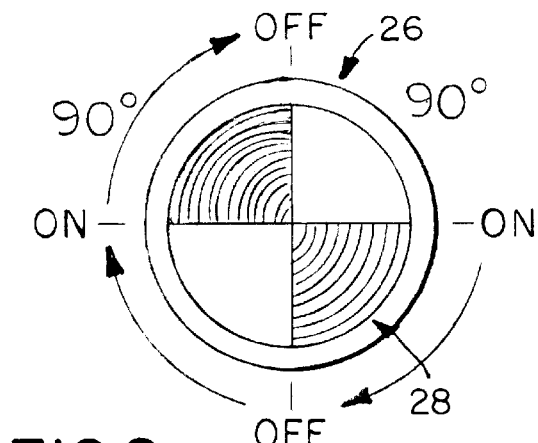
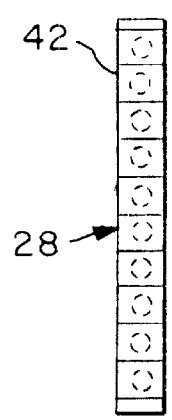

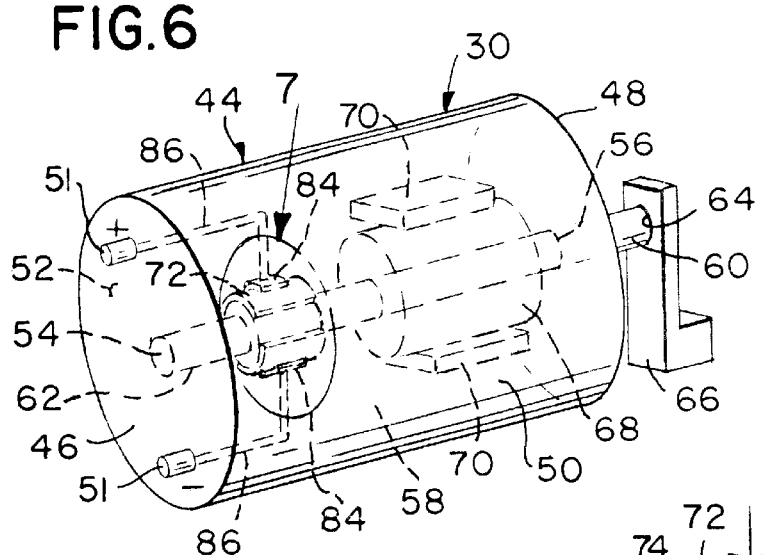
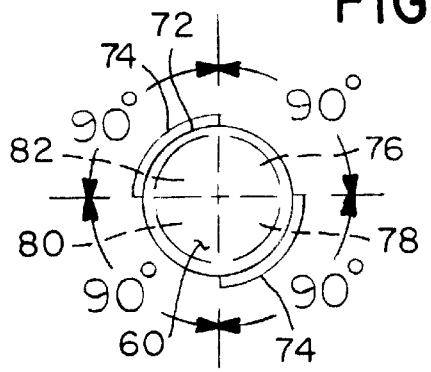
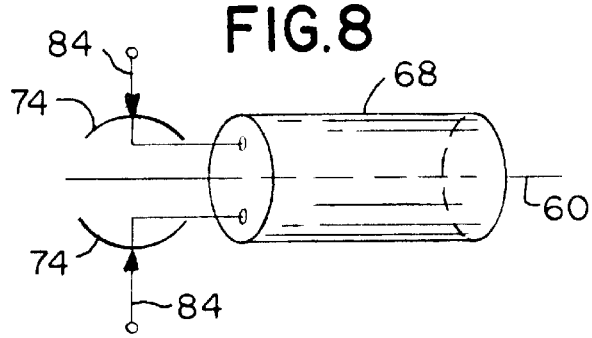
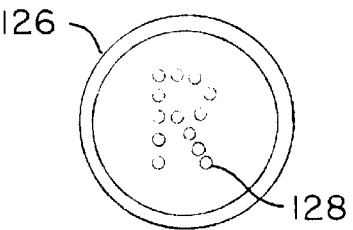
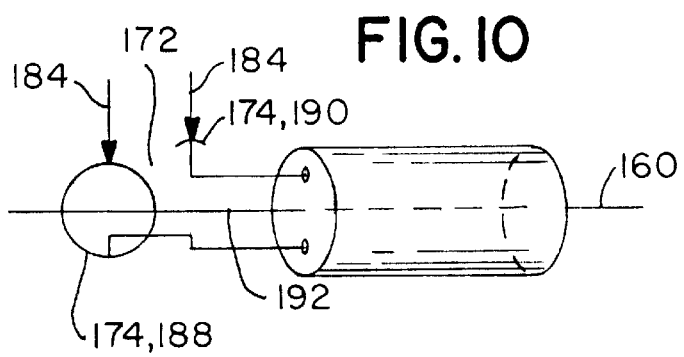

ILLUMINATING NOVELTY DEVICE FOR A HUBCAP

BACKGROUND OF THE INVENTION

1. Field of the Invention

The present invention relates to an illuminating novelty device. More particularly, the present invention relates to an illuminating novelty device for a hubcap.

2. Description of the Prior Art

Numerous innovations for illuminated rotating objects have been provided in the prior art that will be described. Even though these innovations may be suitable for the specific individual purposes to which they address, however, they differ from the present invention.

A FIRST EXAMPLE, U.S. Pat. No. 4,539,496 to Thomas et al. teaches a generator assembly characterized by a hubcap and an elongated arm attached at a first end to a central portion of the hubcap such that it may freely rotate therein. A generator is attached to the second end of the arm which is operative to produce electrical power as the hubcap rotates. Because of the generator's offset position there is a "step-up" effect of the mechanical power supplied to the generator, thus increasing the electrical power developed by the generator. The elongated arm can also be attached to the wheel lugs of the wheel by a suitable frame, or may be manufactured as an integral part of a wheel or hubcap.

A SECOND EXAMPLE, U.S. Pat. No. 4,725,928 to Strepek teaches a self-contained lighting assembly capable of being secured to the wheel of a heavy duty truck that is formed by having a housing with lights mounted on the housing and a generator mounted within the housing for providing power to the lights from the truck is in motion.

A THIRD EXAMPLE, U.S. Pat. No. 4,775,919 to Pearsall et al. teaches a signalling wheel cover, including inner and outer housings, that is provided with lights around the circumference of the outer housing which sequentially illuminate as the two housings rotate with respect to one another. The outer housing is secured to a vehicle wheel. Coils, to which the lights are connected, are mounted to the outer housing. The inner housing, to which magnets are mounted, is rotatably secured relative to the outer housing to allow independent rotation of the two housings. As the wheel carrying the outer housing begins to rotate, the inner housing tends to resist the rotation due to its inertia. This resistance to rotation can be enhanced by adding a counterweight to the inner housing so the inner housing is mounted pendulously. As the coils rotate through the magnetic fields of the magnets, current flow is induced in the coils which causes illumination of the lights in a sequential pattern.

A FOURTH EXAMPLE, U.S. Pat. No. 4,893,877 to Powell et al. teaches a lighted hubcap that includes a cap body that has an outboard side and an opposing inboard side. When the cap body is secured to the wheel of a passenger vehicle, the outboard side faces away from the vehicle. At least one light emitter is incorporated in the cap body so that it emits light from the outboard side of the cap body when energized. A permanent magnet assembly is pivotally secured to the cap body and weighted so that the permanent magnet assembly is in a generally fixed orientation with respect to the passenger vehicle. Electrically conducting windings are secured to the inboard side concentrically about the permanent magnet assembly and are connected to the light emitters. The windings are in magnetic flux coupling relationship with the permanent magnet assembly so that upon rotation of the wheel and, concomitantly, the windings about the generally fixedly oriented permanent magnet assembly, alternating current is generated in the winding for energizing the light emitters.

A FIFTH EXAMPLE, U.S. Pat. No. 5,497,302 to O'Donnell teaches a lighted hubcap for a hub on a wheel of an automobile, comprising a round cover that snaps onto the hub. A structure in the round cover is for Illuminating the round cover. A facility in the round cover is for supplying electrical power to the illuminating structure, only when the automobile moves along and rotates the wheel with the round cover.

A SIXTH EXAMPLE, U.S. Pat. No. 5,876,108 to Chien teaches a rotating object such as a wheel, wheel cover, or hubcap that includes a lighting arrangement in the form of a super-thin lighting element such as an electro-luminescent or photo-luminescent strip or panel. In the case of an electro-luminescent strip or panel, the power supply is positioned on the rotating object so as not to interfere with rotation of the object, and may include a specially designed spring-based motion sensitive switch which can be deactivated by inserting a straw-like member between the poles of the switch.

It is apparent that numerous innovations for illuminated rotating objects have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an illuminating novelty device for a hubcap that avoids the disadvantages of the prior art.

ANOTHER OBJECT of the present invention is to provide an illuminating novelty device for a hubcap that is simple and inexpensive to manufacture.

STILL ANOTHER OBJECT of the present invention is to provide an illuminating novelty device for a hubcap that is simple to use.

BRIEFLY STATED, YET ANOTHER OBJECT of the present invention is to provide an illuminating novelty device for a hubcap that includes a primary housing, illuminators, and a generator. The illuminators include a strip of LEDs that extends diametrically across the primary housing. The generator includes a secondary housing that extends in the primary housing, a shaft, a weight fixedly suspended from the shaft to prevent rotation of the shaft when the secondary housing is rotating, an armature that is fixedly attached to the shaft to form a stator, a pair of pole pieces that are disposed diametrically around the armature and fixedly attached to the secondary housing for rotation therewith to form a rotor, a commutator that is fixed to the shaft and split lengthwise into a pair of parts, wherein each part extends 90 degrees around the shaft, and is spaced 90 degrees apart from an adjacent part, a pair of brushes that are diametrically affixed to the secondary housing for rotation therewith and move along the commutator as the secondary housing rotates, and a pair of wires that electrically communicate the pair of brushes with the pair of terminals, respectively. When the primary housing is rotated by virtue of the hubcap rotating, the illuminators form a BMW pattern.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows:

FIG. 1 is a diagrammatic perspective view of the present invention in use;

FIG. 2 is an enlarged diagrammatic perspective view of the area generally enclosed by the dotted curve identified by arrow 2 in FIG. 1 of the present invention;

FIG. 3 is a diagrammatic cross sectional view taken on line 3—3 in FIG. 2 illustrating the insertion of the present invention into the central opening in the hubcap;

FIG. 4 is a diagrammatic front elevational view taken generally in the direction of arrow 4 in FIG. 3;

FIG. 5 is an enlarged diagrammatic front elevational view of the area generally enclosed by the dotted curve identified by arrow 5 in FIG. 4 of the illuminators of the present invention;

FIG. 6 is an enlarged diagrammatic perspective view of the area generally enclosed by the dotted curve identified by arrow 6 in FIG. 3 of the generator of the present invention;

FIG. 7 is an enlarged diagrammatic front elevational view of the area generally enclosed by the dotted curve identified by arrow 7 in FIG. 6 of the commutator of the generator of the present invention;

FIG. 8 is a diagrammatic view of the electrical communication between the commutator and the armature of the present invention of a first embodiment of the present invention;

FIG. 9 is an enlarged diagrammatic front elevational view taken generally in the direction of arrow 9 in FIG. 1 illustrating the BMW pattern created by the first embodiment of the present invention shown in FIG. 8 when rotated;

FIG. 10 is a diagrammatic view of the electrical communication between the commutator and the armature of the present invention of a second embodiment of the present invention; and FIG. 11 is an enlarged diagrammatic front elevational view taken generally in the direction of arrow 11 in FIG. 1 illustrating the pattern created by the second embodiment of the present invention shown in FIG. 10 when rotated.

LIST OF REFERENCE NUMERALS UTILIZED IN THE DRAWING

First Embodiment 20 illuminating novelty device of present invention for hubcap 22
22 hubcap
24 central opening in hubcap 22 for holding illuminating novelty device 20
26 primary housing for attaching in, and rotating with, central opening 24 of hubcap 22
28 illuminators
30 generator
32 front wall of primary housing 26
34 rear wall of primary housing 26
36 longitudinal side wall of primary housing 26
38 primary chamber contained in primary housing 26
40 compression rebound lip defining rear wall 34 of primary housing 26 for compressing as primary housing 26 is pushed into central opening 24 in hubcap 22 and rebounding after insertion so as to form inner stop for preventing primary housing 26 from leaving central opening 24 in hubcap 22 forwardly
42 strip of LEDs of illuminators 28 for viewing from ambient
44 secondary housing of generator 30
46 front wall of secondary housing 44 of generator 30
48 rear wall of secondary housing 44 of generator 30
50 longitudinal side wall of secondary housing 44 of generator 30
51 pair of terminals of front wall 46 of secondary housing 44 of generator 30
52 inner face of front wall 46 of secondary housing 44 of generator 30
54 bearing centrally disposed on inner face 52 of front wall 46 of secondary housing 44 of generator 30
56 throughbore centrally disposed through rear wall 48 of secondary housing 44 of generator 30
58 secondary chamber contained in secondary housing 44 of generator 30
60 shaft of generator 30
62 first end of shaft 60 of generator 30
64 second end of shaft 60 of generator 30
66 weight of generator 30
68 armature of generator 30
70 pair of pole pieces of generator 30
72 commutator of generator 30
74 pair of parts of commutator 72 of generator 30
76 first imaginary quadrant of shaft 60 when viewed clockwise in lateral cross section from first end 62 thereof
78 second imaginary quadrant of shaft 60 when viewed clockwise in lateral cross section from first end 62 thereof
80 third imaginary quadrant shaft 60 when viewed clockwise in lateral cross section from first end 62 thereof
82 fourth imaginary quadrant when viewed clockwise in lateral cross section from first end 62 thereof
84 pair of brushes of generator 30
86 pair of wires of generator 30

Second Embodiment 128 illuminators
172 commutator
174 pair of parts of commutator 172
184 pair of brushes
188 slip ring of one part of pair of parts 174 of commutator 172
190 minute piece of other part of pair of parts 174 of commutator 172

DETAILED DESCRIPTION OF THE PREFERRED EMBODIMENT

Referring now to the figures, in which like numerals indicate like parts, and particularly to FIG. 1, the illuminating novelty device of the present invention is shown generally at 20 for a hubcap 22, wherein the hubcap 22 has a central opening 24 for holding the illuminating novelty device 20.

The overall configuration of the illuminating novelty device 20 can best be seen in FIGS. 2–4, and as such, will be discussed with reference thereto.

The illuminating novelty device 20 comprises a primary housing 26 for attaching in, and rotating with, the central opening 24 of the hubcap 22.

The illuminating novelty device 20 further comprises illuminators 28 disposed on the primary housing 26.

The illuminating novelty device 20 further comprises a generator 30 contained in the primary housing 26, and in electrical communication with, and powers, the illuminators 28.

The specific configuration of the primary housing 26 can best be seen in FIGS. 2 and 3, and as such, will be discussed with reference thereto.

The primary housing 26 is cylindrically-shaped and has a front wall 32 that is disk-shaped, a rear wall 34 that is circular-shaped, and a longitudinal side wall 36 that is cylindrically-shaped and extends from the front wall 32 thereof to the rear wall 34 thereof.

The primary housing 26 contains a primary chamber 38 that is coaxially disposed with the longitudinal side wall 36 thereof, and extends from the front wall 32 thereof to the rear wall 34 thereof.

The rear wall 34 of the primary housing 26 is open and defined by a compression rebound lip 40 that extends completely circumferentially therearound for compressing as the primary housing 26 is pushed into the central opening 24 in the hubcap 22 and rebounding after insertion so as to form an inner stop for preventing the primary housing 26 from leaving the central opening 24 in the hubcap 22 forwardly.

The front wall 32 of the primary housing 26 extends circumferentially outwardly from the longitudinal side wall 36 of the primary housing 26 so as to form an outer stop for preventing the primary housing 26 from leaving the central opening 24 in the hubcap 22 rearwardly.

The specific configuration of the illuminators 28 can best be seen in FIGS. 4 and 5, and as such, will be discussed with reference thereto.

The illuminators 28 comprise a strip of LEDs 42 that is slender and elongated, and extends diametrically across the front wall 32 of the primary housing 26 for viewing from the ambient.

The specific configuration of the generator 30 can best be seen in FIGS. 6–8, and as such, will be discussed with reference thereto.

The generator 30 comprises a secondary housing 44 that is cylindrically-shaped, and has a front wall 46 that is circular-shaped, a rear wall 48 that is circular-shaped, and a longitudinal side wall 50 that is cylindrically-shaped and extends from the front wall 46 thereof to the rear wall 48 thereof.

The secondary housing 44 extends coaxially in the primary chamber 38 for rotation therewith, wherein the front wall 46 thereof abuts against the front wall 32 of the primary housing 26, the rear wall 48 thereof extends through the rear wall 34 of the primary housing 26, and the longitudinal side wall 50 thereof extends coaxially inwardly-spaced from the longitudinal side wall 36 of the primary housing 26.

The front wall 46 of the secondary housing 44 has a pair of terminals 51 that are spaced diametrically apart, and are in electrical communication with the illuminators 28.

The front wall 46 of the secondary housing 44 further has an inner face 52 with a bearing 54 that is centrally disposed thereon.

The rear wall 48 of the secondary housing 44 has a throughbore 56 that is centrally disposed.

The secondary housing 30 contains a secondary chamber 58 that is coaxially disposed with the longitudinal side wall 50 thereof, and extends from the front wall 46 thereof to the rear wall 48 thereof.

The generator 30 further comprises a shaft 60 that extends coaxially in the secondary housing 30, and has a first end 62 that is rotatably positioned in the bearing 54 on the front wall 46 of the secondary housing 30 and a second end 64 that extends through, and past, the throughbore 56 in the rear wall 48 of the secondary housing 30.

The generator 30 further comprises a weight 66 that is fixedly suspended from the second end 64 of the shaft 60 to prevent rotation of the shaft 60 when the secondary housing 30 is rotating.

The generator 30 further comprises an armature 68 that is fixedly attached to the shaft 64 to form a stator, and is disposed in proximity to the rear wall 48 of the secondary housing 30.

The generator 30 further comprises a pair of pole pieces 70 that are separate, and spaced-apart, from each other diametrically around the armature 68, and are fixedly attached to the secondary housing 30 for rotation therewith to form a rotor.

The generator 30 further comprises a commutator 72 that is fixed to the shaft 60, and is disposed between the armature 68 and the front wall 46 of the secondary housing 30.

The commutator 72 is of the direct current type, and as a result thereof, circumferentially surrounds the shaft 60, and is split lengthwise into a pair of parts 74.

Each part 74 of the commutator 72 extends 90 degrees around the shaft 60, and is spaced 90 degrees apart from an adjacent part 74.

The shaft 60, when viewed clockwise in lateral cross section from the first end 62 thereof, is divided into four quadrants, to wit, a first imaginary quadrant 76 that extends from 0° to 90°, a second imaginary quadrant 78 that extends from 90° to 180°, a third imaginary quadrant 80 that extends from 180° to 270°, and a fourth imaginary quadrant 82 that extends from 270° to 360°.

One part 74 of the commutator 72 extends along the second imaginary quadrant 78 of the shaft 60, while the other part 74 of the commutator 72 extends along the fourth imaginary quadrant 82 of the shaft 60.

The generator 30 further comprises a pair of brushes 84 that are diametrically affixed to the secondary housing 30 for rotation therewith, and move along, the commutator 72, as the secondary housing 30 rotates.

The generator 30 further comprises a pair of wires 86 that electrically communicate the pair of brushes 84 with the pair of terminals 51, respectively.

As shown, in FIG. 9, when the primary housing 26 is rotated, by virtue of the hubcap 22 rotating, the pair of brushes 84 electrically communicate with the pair of parts 74 of the commutator 72 only in the second quadrant 78 and the fourth quadrant 82, and as a result thereof, illuminate the illuminators 28 only in these quadrants, and as a result thereof, form a BMW (Bavarian Motor Works) pattern.

A second embodiment of the illuminators 128, the pair of parts 174 of the commutator 172, and the pair of brushes 184 can best be seen in FIGS. 10 and 11, and as such, will be discussed with reference thereto.

The illuminators 128 are formed into any customizable pattern.

One part of the pair of parts 174 is a slip ring 188 that completely surrounds the shaft 160, while the other part of the pair of parts 174 is a minute piece 190 that is disposed only on an upper portion 192 of the shaft 160.

One brush 184 is in constant electrical communication with the slip ring 188 during rotation of the secondary housing 30, while the other brush 184 electrically communicates with the minute piece 190 only when the other brush 184 is at the upper portion 192 of the shaft 160, and as shown in FIG. 11, the illuminators 128 illuminates for only a fraction of time during each rotation, by virtue of the minute piece 190 being disposed only on the upper portion 192 of the shaft 160.

It will be understood that each of the elements described above, or two or more together, may also find a useful application in other types of constructions differing from the types described above.

While the invention has been illustrated and described as embodied in an illuminating novelty device for a hubcap, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An illuminating novelty device for a hubcap, wherein the hubcap has a central opening for holding said illuminating novelty device, said device comprising:
   a) a primary housing for attaching in, and rotating with, the central opening of the hubcap;
   b) illuminators disposed on said primary housing; and
   c) a generator contained in said primary housing, and being in electrical communication with, and powering, said illuminators;
   wherein said primary housing is cylindrically-shaped, and has:
      i) a front wall that is disk-shaped;
      ii) a rear wall that is circular-shaped; and
      iii) a longitudinal side wall that is cylindrically-shaped and extends from said front wall thereof to said rear wall thereof;
   wherein said primary housing contains a primary chamber that is coaxially disposed with said longitudinal side wall thereof, and extends from said front wall thereof to said rear wall thereof;
   wherein said illuminators comprise a strip of linearly aligned LEDs that is slender and elongated, and extends diametrically across said front wall of said primary housing for viewing from the ambient; .
   wherein said generator comprises a secondary housing that is cylindrically-shaped, and has:
      i) a front wall that is circular-shaped;
      ii) a rear wall that is circular-shaped; and
      iii) a longitudinal side wall that is cylindrically-shaped and extends from said front wall thereof to said rear wall thereof;
   wherein said front wall of said secondary housing has a pair of terminals that are spaced diametrically apart, and are in electrical communication with said illuminators;
   wherein said front wall of said secondary housing has an inner face with a bearing that is centrally disposed thereon;
   wherein said rear wall of said secondary housing has a throughbore that is centrally disposed;
   wherein said generator further comprises a shaft that extends coaxially in said secondary housing, and has:
      i) a first end that is rotatably positioned in said bearing on said front wall of said secondary housing; and
      ii) a second end that extends through, and past, said throughbore in said rear wall of said secondary housing;
   wherein said generator further comprises an armature that is fixedly attached to said shaft to form a stator, and is disposed in proximity to said rear wall of said secondary housing;
   wherein said generator further comprises a commutator that is fixed to said shaft, and is disposed between said armature and said front wall of said secondary housing;
   wherein said commutator is of said direct current type, and as a result thereof, circumferentially surrounds said shaft, and is split lengthwise into a pair of parts;
   wherein each part of said commutator extends 90 degrees around said shaft, and is spaced 90 degrees apart from an adjacent part;
   wherein said shaft, when viewed clockwise in lateral cross section from said first end thereof, is divided into four quadrants that comprise:
      i) a first imaginary quadrant that extends from 0° to 90°;
      ii) a second imaginary quadrant that extends from 90° to 180°;
      ii) a third imaginary quadrant that extends from 180° to 270°; and
      iii) a fourth imaginary quadrant that extends from 270° to 360°;
   wherein one part of said commutator extends along said second imaginary quadrant of said shaft, while the other part of said commutator extends along said fourth imaginary quadrant of said shaft;
   wherein said generator further comprises a pair, of brushes that are diametrically affixed to said secondary housing for rotation therewith, and move along said commutator as said secondary housing rotates; and
   wherein said pair of brushes electrically communicate with said pair of parts of said commutator only in said second quadrant and said fourth quadrant, and as a result thereof, illuminate said illuminators only in these quadrants, and as a result thereof, form vertical and horizontal intersecting diameters defining four quadrants having solid upper left and lower right quadrants, when said primary housing is rotated by virtue of the hubcap rotating.

2. The device as defined in claim 1, wherein said rear wall of said primary housing is open and defined by a compression rebound lip that extends completely circumferentially therearound for compressing as said primary housing is pushed into the central opening in the hubcap and rebounding after insertion so as to form an inner stop for preventing said primary housing from leaving the central opening in the hubcap forwardly.

3. The device as defined in claim 1, wherein said front wall of said primary housing extends circumferentially outwardly from longitudinal side wall of said primary housing so as to form an outer stop for preventing said primary housing from leaving the central opening in the hubcap rearwardly.

4. The device as defined in claim 1, wherein said secondary housing extends coaxially in said primary chamber for rotation therewith, wherein said front wall thereof abuts against said front wall of said primary housing, said rear wall thereof extends through said rear wall of said primary housing, and said longitudinal side wall thereof extends coaxially inwardly-spaced from said longitudinal side wall of said primary housing.

5. The device as defined in claim 1, wherein said secondary housing contains a secondary chamber that is coaxially disposed with said longitudinal side wall thereof, and extends from said front wall thereof to said rear wall thereof.

6. The device as defined in claim 1, wherein said generator further comprises a weight that is fixedly suspended from said second end of said shaft to prevent rotation of said shaft when said secondary housing is rotating.

7. The device as defined in claim 1, wherein said generator further comprises a pair of pole pieces that are separate, and spaced-apart, from each diametrically around said armature, and fixedly attached to said secondary housing for rotation therewith to form a rotor.

8. The device as defined in claim 1, wherein said generator further comprises a pair of wires that electrically communicate said pair of brushes with said pair of terminals, respectively.

\* \* \* \* \*